(12) United States Patent  
Cho et al.

(10) Patent No.: US 9,167,203 B2  
(45) Date of Patent: Oct. 20, 2015

(54) METHOD AND APPARATUS FOR VIDEO CALL IN COMMUNICATION SYSTEM

(71) Applicant: Samsung Electronics Co., Ltd., Gyeonggi-do (KR)

(72) Inventors: Ilhaeng Cho, Seoul (KR); Kyoungtaek Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/256,397

(22) Filed: Apr. 18, 2014

(65) Prior Publication Data

US 2014/0313276 A1    Oct. 23, 2014

(30) Foreign Application Priority Data

Apr. 18, 2013   (KR) .................. 10-2013-0042692

(51) Int. Cl.
*H04N 7/14*    (2006.01)
*H04N 5/77*    (2006.01)
*H04N 5/232*   (2006.01)

(52) U.S. Cl.
CPC ............ *H04N 7/147* (2013.01); *H04N 5/23212* (2013.01); *H04N 5/772* (2013.01)

(58) Field of Classification Search
CPC .............. H04M 1/72522; H04M 2250/52; H04N 7/147; H04N 7/142
USPC ........................ 348/14.07, 14.08
See application file for complete search history.

(56) References Cited

U.S. PATENT DOCUMENTS

| 2004/0203608 | A1* | 10/2004 | Osann, Jr. ............... 455/412.1 |
| 2007/0070186 | A1  | 3/2007  | Fujimori et al. |
| 2009/0087099 | A1  | 4/2009  | Nakamura |
| 2010/0083137 | A1  | 4/2010  | Shin et al. |
| 2011/0018961 | A1* | 1/2011  | Choi et al. ............. 348/14.12 |
| 2011/0058011 | A1* | 3/2011  | Kim ....................... 348/14.02 |

FOREIGN PATENT DOCUMENTS

| JP | 2009089077 | 4/2009 |
| KR | 20110035262 | 4/2011 |

* cited by examiner

*Primary Examiner* — Creighton Smith  
(74) *Attorney, Agent, or Firm* — The Farrell Law Firm, P.C.

(57) ABSTRACT

A method for a video call in a terminal for performing the video call includes receiving at least one of a video of another party user side or a video of a terminal user side; determining whether a preset capture condition is satisfied based on the received video; capturing an image satisfying the preset capture condition; determining whether the video call is terminated; and displaying at least one of the captured images on a display unit when the video call is terminated.

22 Claims, 13 Drawing Sheets

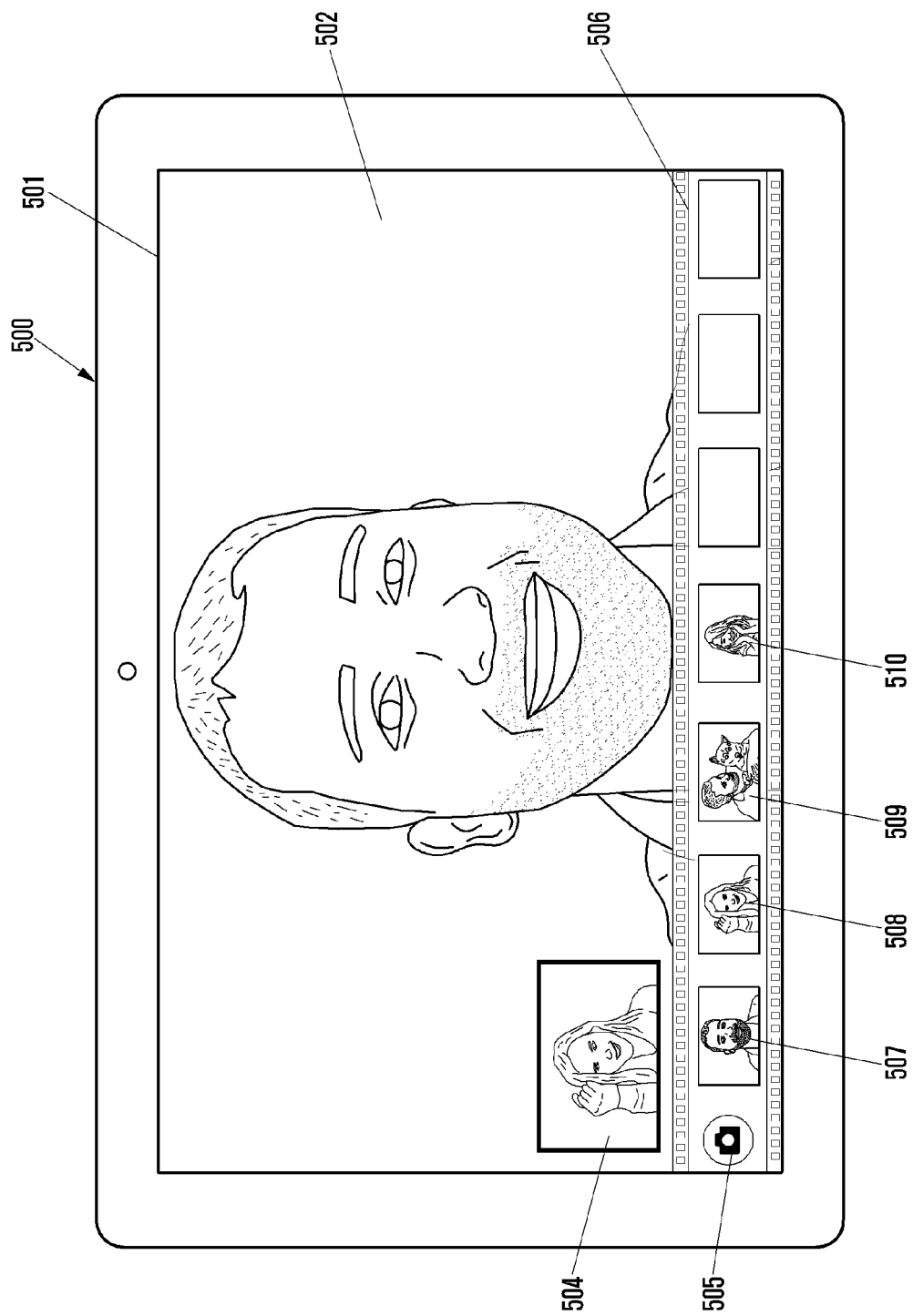

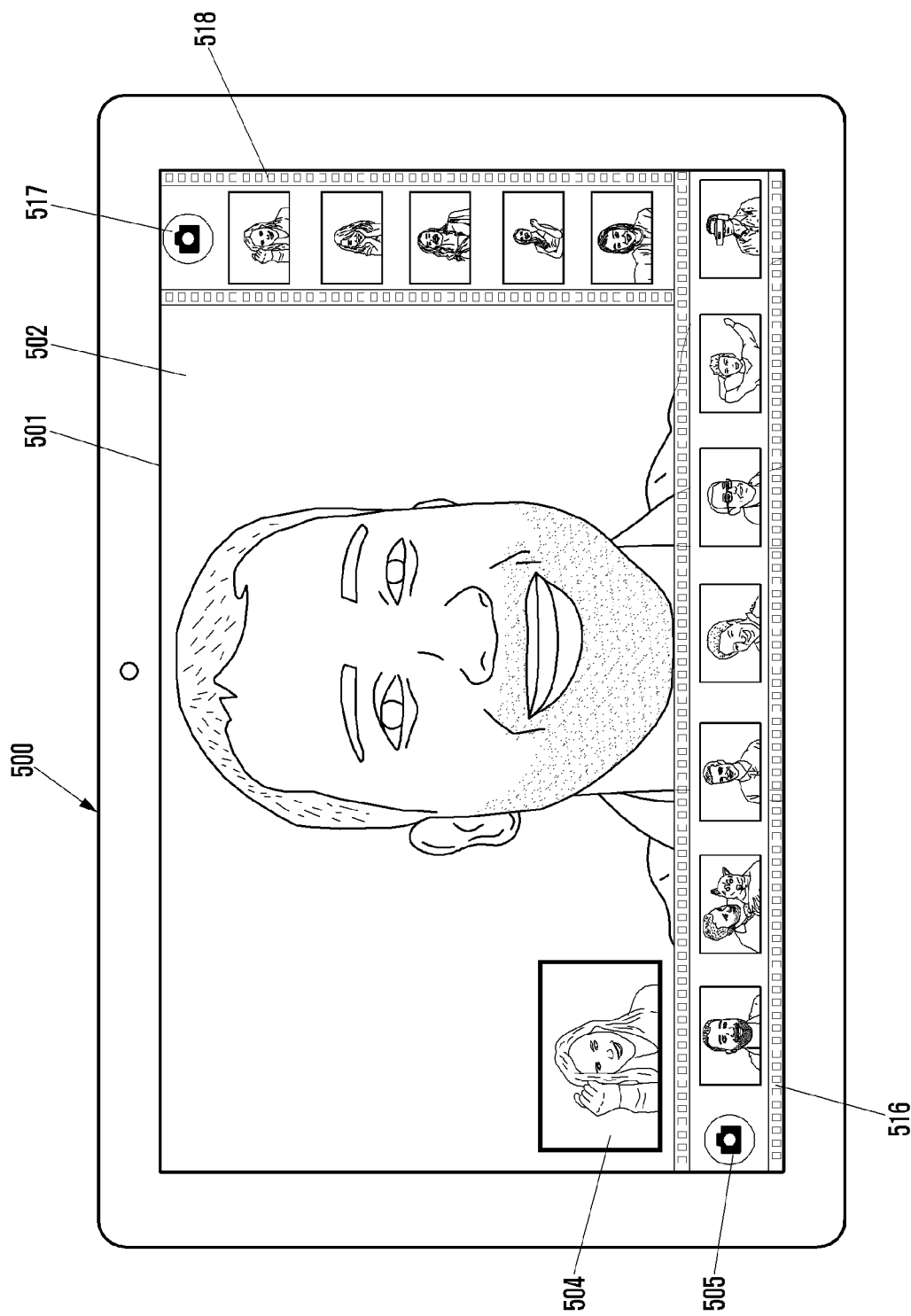

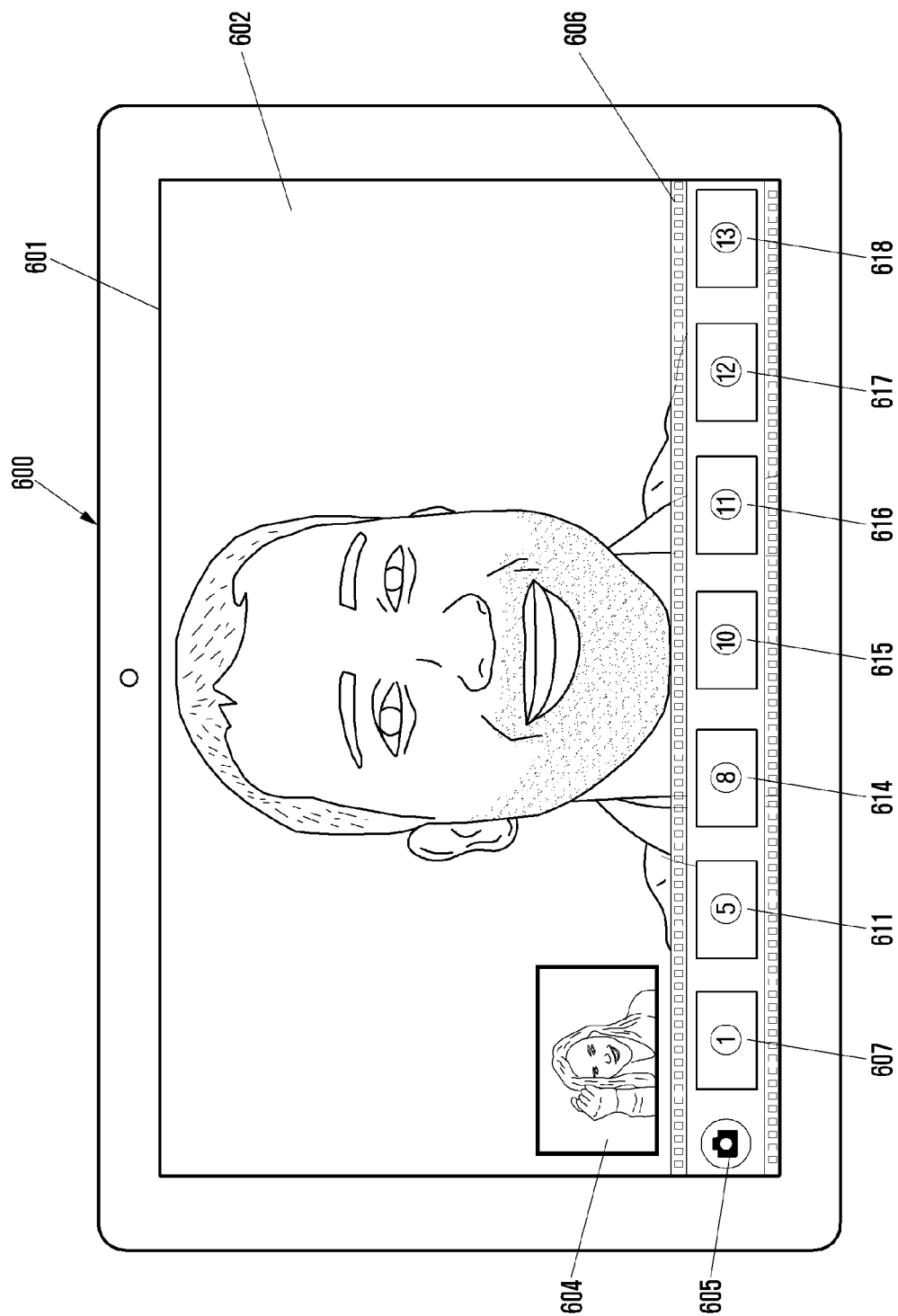

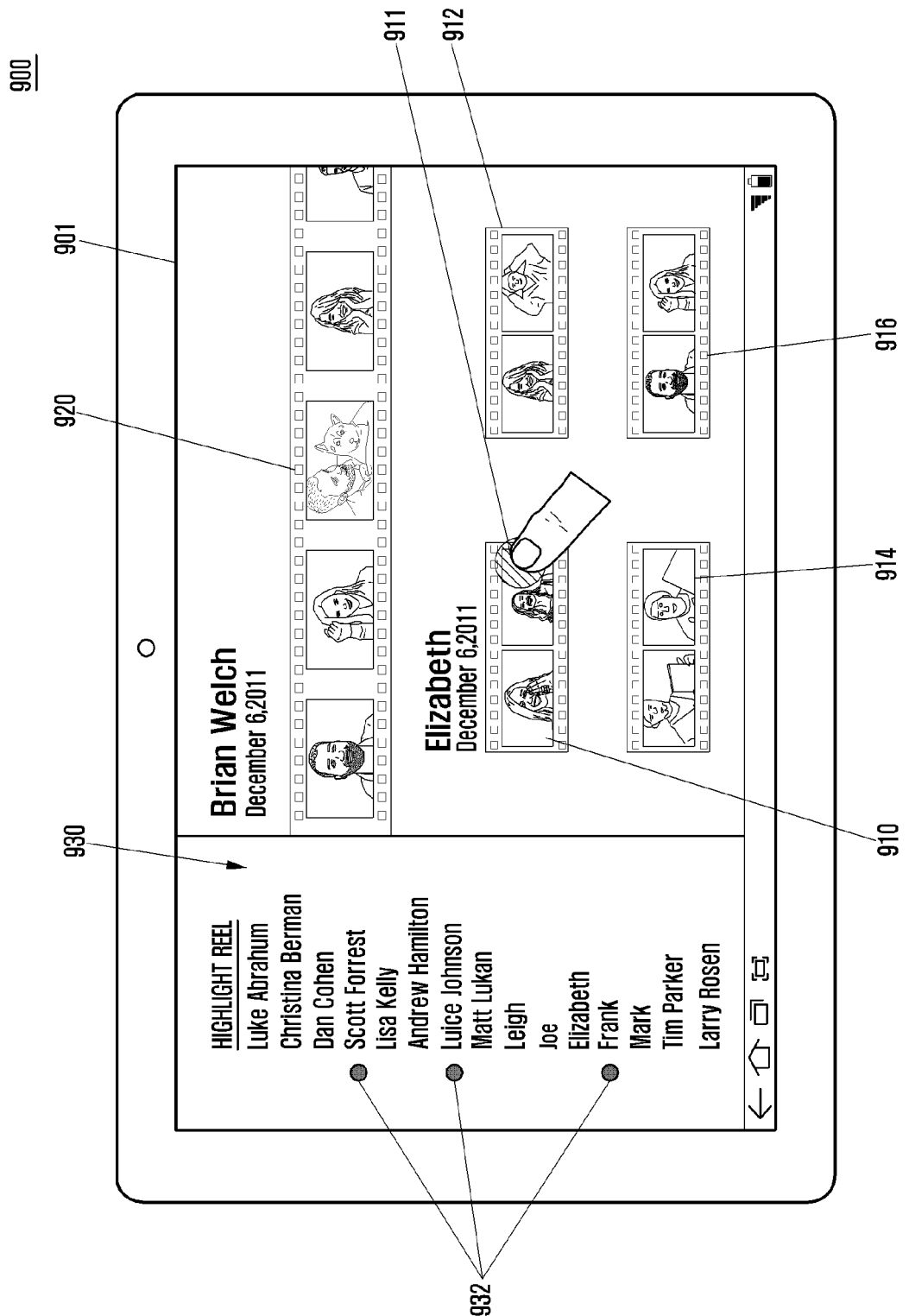

METHOD AND APPARATUS FOR VIDEO CALL IN COMMUNICATION SYSTEM

PRIORITY

This application claims priority under 35 U.S.C. §119(a) to a Korean Patent Application filed on Apr. 18, 2013 in the Korean Intellectual Property Office and assigned Serial No. 10-2013-0042692, the entire disclosure of which is incorporated herein by reference.

BACKGROUND

1. Field of the Invention

The present invention generally relates to a method and an apparatus for a video call in a communication system, and more particularly, to a method of capturing video call videos according to a preset condition during a video call through a terminal to easily provide the captured video call videos to a user, and an apparatus thereof.

2. Description of the Related Art

A call between users according to the related art has a characteristic to provide only a voice call through exchange of a voice. With the continued development of communication technology, bandwidth has been increased and performance of a terminal has also been developed such that a video call is now widely used. In recent years, types of terminals which can provide the video call have been increased. In a case of the video call, unlike the voice call according to the related art, various information can be transferred through a call, and user convenience can be increased.

However, although the type of information which can be exchanged through the video call has been increased, methods that enable a user to easily call based on video call, or can improve user convenience by providing available information, are insufficient for users. Further, when storing a moving image, a large storage space is required as compared with the voice call to store call contents. Hence, a method for solving the above problem is required.

Accordingly, there is a need for a method and an apparatus capable of improving user convenience based on such video call.

SUMMARY

The present invention has been made to address at least the above problems, and to provide at least the advantages described below. Accordingly, an aspect of the present invention provides a method of transferring related information during a call or after the call so that a user may easily determine information related to the video call during the video call.

An aspect of the present invention provides a method of easily managing information related to a video call which may be shared between users, and an apparatus thereof.

Another aspect of the present invention provides a method of providing information related to a performed video call after the video call is performed to a user, and an apparatus thereof.

In accordance with an aspect of the present invention, a method for a video call in a terminal for performing the video call includes receiving at least one of a video of another party user side or a video of a terminal user side; determining whether a preset capture condition is satisfied based on the received video; capturing at least one image satisfying the preset capture condition; determining whether the video call is terminated; and displaying at least one of the captured images on a display unit when the video call is terminated.

In accordance with another aspect of the present invention, a terminal for performing a video call includes a transceiver configured to receive at least one of a video of another party user side or a video of a terminal user side; a controller configured to determine whether a preset capture condition is satisfied based on the received video, to capture an image of the video satisfying the preset capture condition, and to determine whether the video call is terminated; and a display unit configured to display at least one of the captured images when the video call is terminated.

BRIEF DESCRIPTION OF THE DRAWINGS

The above and other aspects, features and advantages of the present invention will be more apparent from the following detailed description in conjunction with the accompanying drawings, in which:

FIGS. 5A and 5B are diagrams illustrating a display unit when the terminal performs the video call according to an embodiment of the present invention;

FIGS. 6A and 6B are diagrams illustrating a method of displaying a moving image captured during a video call by the terminal according to an embodiment of the present invention;

FIG. 9 is a diagram illustrating a method of managing and sharing a video call list stored in the terminal according to an embodiment of the present invention.

DETAILED DESCRIPTION OF EMBODIMENTS OF THE PRESENT INVENTION

Figure 1:
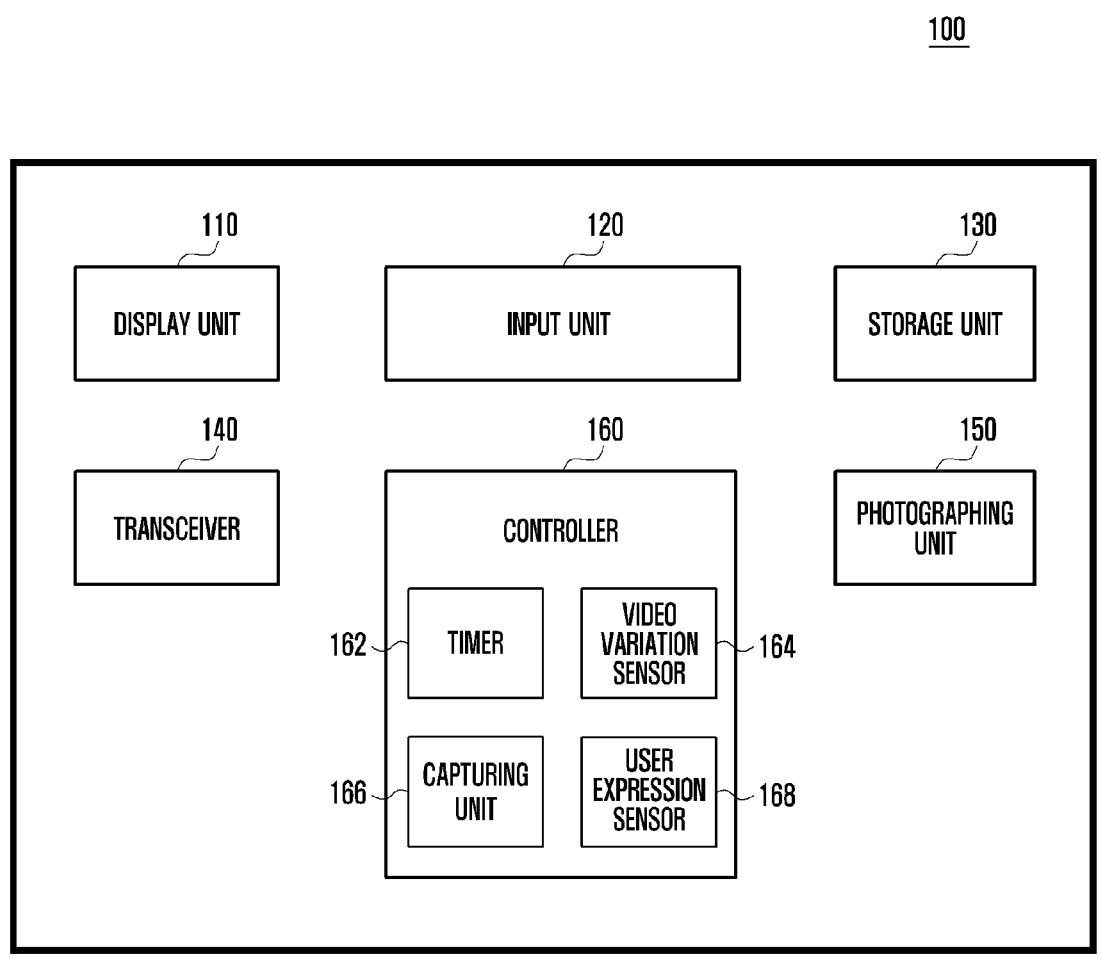
FIG. 1 is a block diagram illustrating a configuration of a terminal according to an embodiment of the present invention.

Embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Here, it is understood that each block of flowcharts and the combinations of the flowcharts can be performed by computer program instructions. Since computer program instructions may be mounted in a processor of a universal computer, a special computer or other programmable data processing equipment, instructions performed through a processor of a computer or other programmable data processing equipment generates means for performing functions described in block(s) of the flowcharts. Since the computer program instructions may be stored in a computer available or computer readable memory capable of orienting a computer or other programmable data processing equipment to implement functions in a specific scheme, instructions stored in the computer available or computer readable memory may produce manufacturing articles involving an instruction means executing functions described in block(s) of flowcharts. Because the computer program instructions may be mounted on a computer or other programmable data processing equipment, a series of operation steps are performed in the computer or other programmable data processing equipment to create a process executed by the computer such that instructions performing the computer or other programmable data processing equipment may provide steps for executing functions described in block(s) of flowcharts.

Further, each block may indicate a part of a module, a segment, or a code including at least one executable instruction for executing specific logical function(s). It should be noticed that several execution examples may generate functions described in blocks out of an order. For example, two continuously shown blocks may be simultaneously performed, and the blocks may be performed in a converse order according to corresponding functions.

As used in this embodiment, the term "~ unit" refers to software or a hardware structural element such as FPGA or ASIC, and the "~ unit" perform some roles. However, the "~ unit" is not limited to software or hardware. The "~ unit" can be configured to be stored in an addressable storage medium and to play at least one processor. Accordingly, for example, the "~ unit" includes software structural elements, object-oriented software structural elements, class structural elements, task structural elements, processes, functions, attributes, procedures, subroutines, segments of a program code, drivers, firmware, microcode, circuit, data, database, data structures, tables, arrays, and variables. Functions provided in structural elements and "~ units" may be engaged by the smaller number of structural elements and "~ units", or may be divided by additional structural elements and "~ units". Furthermore, structural elements and "~ units" may be implemented to play a device or at least one CPU in a security multimedia card.

A portable terminal according to an embodiment of the present invention is an electronic device including at least one of a mobile phone, a Personal Digital Assistant (PDA), a navigation device, a digital broadcasting receiver, or a Portable Multimedia Player (PMP).

The portable terminal according to the embodiment of the present invention is applicable not only to a folder type portable terminal, but also to a bar type portable terminal, a flip type portable terminal, a sliding type portable terminal, a rotating type portable terminal, and a combination type portable terminal.

FIG. 1 is a block diagram illustrating a configuration of a terminal according to an embodiment of the present invention.

Referring to FIG. 1, the terminal 100 includes a display unit 110, an input unit 120, a storage unit 130, a transceiver 140, a photographing unit 150, and a controller 160.

The display unit 110 displays information related to an operation of the terminal 100 to a user. Operation information of the terminal 100 according to control of the controller 160 is displayed to the user through the display unit 110. Further, when the terminal 100 performs a video call, the terminal 100 displays a video of a receiver and a video of a sender on the display unit 110. Further, the display unit 110 may display a captured image of a video call under control of the controller 160.

The input unit 120 receives a user input to provide an operation necessary for the operation of the terminal 100 to the controller 160. The input unit 120 may include at least one of a touch screen, a physical button, or an electronic button. The input unit 120 may receive the start and termination commands of the video call from the user, may receive receiver and sender information, and may receive a capture input from a part desired by the user during the video call.

The storage unit 130 stores data transmitted/received through the transceiver 140, a user input through the input unit 120, and a value for a result of signal processing to be operated by the controller 160 based on the above data and user input. In more detail, the storage unit 130 stores at least one of videos of the receiver and the sender during the video call, an image captured from the videos, or period information for capturing the image.

The transceiver 140 transmits and receives data to and from other communication entities. In more detail, the transceiver 140 transmits and receives at least one of video call information transmitted/received to and from another terminal, specific video or image request information, or stored video call information. Further, the transceiver 140 transmits and receives data to and from another communication entity under control of the controller 160.

The photographing unit 150 records a video and a sound according to a user input or under control of the controller 160. In more detail, according to the embodiment of the present invention, the photographing unit 150 photographs at least one of a user who attempts the video call or a surrounding environment of the user. The video photographed by the photographing unit 150 may be stored in the storage unit 130.

The controller 160 controls each constituent element of the terminal 100, and may include at least one of a timer 162, an video variation sensor 164, a capturing unit 166, and a user expression sensor 168.

The timer 162 measures time. In more detail, whenever a preset time elapses under control of the timer 162, the capturing unit 166 captures video transmitted/received during the video call. The preset time may be a set of values having a fixed period and a period which is increased as time elapses. The capturing unit 166 captures the video according to time variation measured by the timer 162 while the video call is performed. The period for capturing video may include a first time interval and a second time interval. In the initial stage of the video call, the capturing unit 166 captures the video with the first time interval. When the video call continues and the preset time has elapsed, the capturing unit 166 captures the video with the second time interval. The first time interval may be less than the second time interval.

The video variation sensor 164 determines variations of the video based on a transmitted/received video call. In detail, when variation of the video is greater than or equal to a specific value in a specific time interval, the video variation sensor 164 determines that the variation of the video is greater than or equal to a specific level. The variation of the video may include variation of entire video image or variation of a face expression through face recognition of a user performing the video call. Accordingly, when the expression variation of the user performing the video call is greater than or equal to a specific value, the video variation sensor 164 provides information reporting that the variation of the video is greater than or equal to the specific value to the capturing unit 166. Accordingly, when variation of at least one of transmitted/received videos is greater than or equal to the specific value, the capturing unit 166 captures the video. Further, the video variation sensor may detect the variation of the video based on at least one of a moving speed of the terminal or a volume of an input sound.

The capturing unit 166 captures the video of a transmitted/received video call under control of the controller 160. When the video is captured according to user input, the capturing unit 166 captures an image within a certain interval before and after a time when a capture signal is input to the input unit 120. The image captured by the capturing unit 166 may be stored in the storage unit 130, and may be transmitted to another communication entity through the transceiver 140.

Further, the user expression sensor 168 detects expression of a call transmission/reception user. In addition, the user expression sensor 168 may detect an expression variation of the user. Accordingly, when the expression variation of the user is detected to be greater than or equal to a preset degree, the user expression sensor 168 performs an operation of capturing the video including the expression variation. In addition, when the user shows a specific expression during the video call, the user expression sensor 168 controls the terminal 100 to perform an operation of capturing the video showing the specific expression.

In more detail, when it is detected that the user shows an expression such as a smile during a call, the user expression sensor 168 controls the terminal 100 to capture the image of video call which shows the smile expression. The expression detected by the user expression sensor 168 is not limited to the smile expression, but may include all expressions which may be identified and defined, as well as a frown or surprised expression. Moreover, the user expression sensor 168 may transfer the detected expression to the storage unit 130, and the storage unit 130 may correlate the image captured according to the detected expression with the detected expression to store. In detail, the storage unit 130 may store a smile expression or a frown expression of the user for each expression. When there is a request from the controller 160, the storage unit 130 may provide the captured image to the controller 160 for each stored expression.

Figure 2:
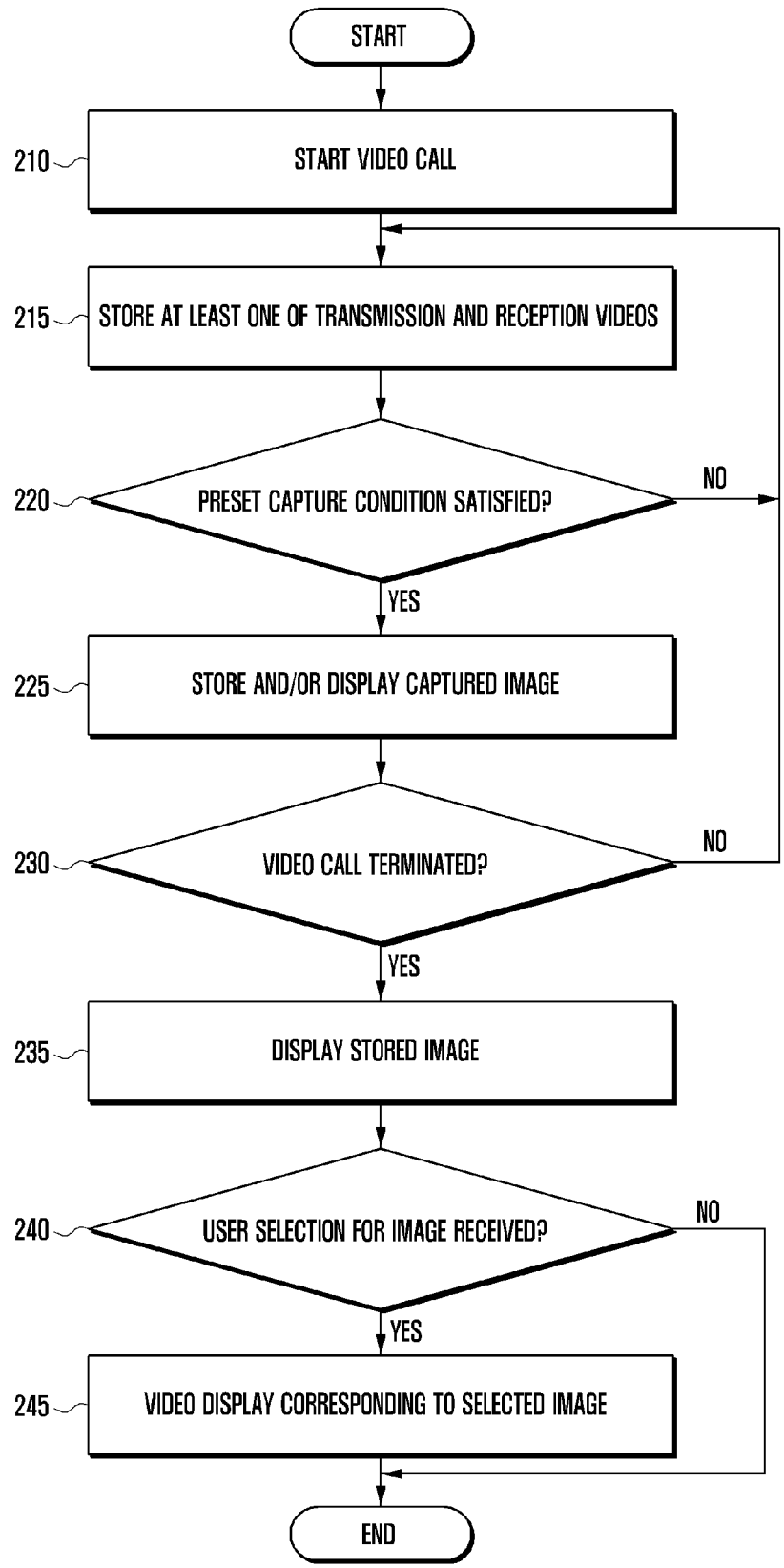
FIG. 2 is a flowchart illustrating an operation of the terminal to perform a video call according to an embodiment of the present invention.

FIG. 2 is a flowchart illustrating an operation of the terminal to perform a video call according to an embodiment of the present invention.

Referring to FIG. 2, at step 210, the terminal 100 performs a video call. The terminal 100 starts the video call with another terminal according to a signal transmission of user of the terminal, or performs the video call based on a reception request of the video call from another terminal.

At step 215, the terminal 100 stores at least one of a transmission video or reception video included in the contents of the video call. However, a procedure of storing the video may be selectively performed. The terminal may not store a transmitted/received video but may directly perform a next operation.

At step 220, the terminal 100 determines whether a preset capture condition is satisfied. The preset capture condition includes at least one of a case where a specific period elapses, a case where a capture input of the user is received, a case where a specific expression of the user is detected, or a case where variation of the video greater than or equal to a specific level is detected.

In more detail, when a certain time elapses, the terminal 100 may capture at least one of reception video or transmission video. When a length of the video call is increased, the certain time may be set to be a longer time. Accordingly, an initial capture period may be shorter than a later capture period in the same video call.

Furthermore, when a capture input of the user is received, the terminal 100 may capture a selected video corresponding to the input. The capture input may be input with respect to at least one of a reception video or a transmission video, and the terminal 100 captures the video corresponding to the input.

Further, the terminal 100 may capture the video by detecting an expression of a user performing the video call. In detail, when the user shows a specific expression, the terminal 100 may determine that a preset capture condition is satisfied. The specific expression may include one of a smile expression, a frown expression, and a surprised expression. In addition, when the user shows an identifiable expression, the terminal may determine that the preset capture condition is satisfied. Further, the terminal may determine that the preset capture condition is satisfied only when an expression corresponding to the specific expression is detected according to setting. The specific expression may be determined according to user setting or setting by manufacturer of the terminal. When it is detected that the user shows a smile expression during the video call, the terminal may determine that the preset capture condition is satisfied. Further, according to the embodiment, when the expression variation of the user performing the video call exceeds a preset degree within a preset time, the terminal may determine that the preset capture condition is satisfied.

Further, the terminal 100 may capture the video by detecting video variation. The detection of the video variation may be determined based on an operation performed by the video variation sensor 164 of FIG. 1. At least one of reception video or transmission video may be captured according to the determination result.

When the preset capture condition is not satisfied in step 220, the process returns to step 215, and the terminal 100 may continuously store at least one of transmission video or reception video.

When the preset capture condition is satisfied, at step 225, the terminal performs at least one of storage operation or display operation of the captured image. In more detail, the terminal 100 displays the captured images on a display unit 110 of the terminal 100. The display unit 110 may display the captured images in order of capture. Further, the display unit 110 may display both images captured from the reception video and the transmission video on the same region or a separated region on the display unit 110. In addition, the terminal 100 may display the captured images on the display unit 110 of the terminal 100 in a slide show format. The slide show format forms a slide show display region on a part of the display unit 110 or the entire display unit 110 of the terminal 100, and the captured images may be displayed on the slide show display region. The displayed images may be sequentially or arbitrarily played according to user input. An operation of displaying the captured images will be described below in detail.

At step 230, the terminal 100 determines whether the video call is terminated. The termination of the video call may be performed when a termination input is received from the user or a signal according to call termination of the other party user is received by the terminal 100, but the present invention is not limited thereto.

As a result of the determination of step 230, when the video call is not terminated, the terminal 100 returns to step 215 to continuously perform the call.

As a result of the determination of step 230, when the video call is terminated, at step 235, the terminal 100 displays the image which is stored at step 225. In detail, the terminal 100 displays a part of the image or the entire image captured and stored at step 225 when the video call is terminated. At least one of selected images may be sequentially displayed to be overlapped or may be displayed while fading-out the images on the display unit 110 of the terminal 100. Further, the terminal may display at least one of the selected images on the display unit 110 of the terminal 100 in the slide show format or a thumbnail view format.

At step 235, the terminal 100 displays an image satisfying a specific condition among the images captured during the video call on the display unit 110. In more detail, the terminal 100 may display only an image selected according to user selection among the captured images. Further, the terminal 100 may display only an image in which it is determined that the user shows a specific expression. The terminal 100 may display only an image in which the user of the video call shows a smile expression. In addition, the terminal 100 may differently display the images according to the expression of the user during the video call. Further, the terminal 100 may capture an image for each expression which the user or the terminal 100 can recognize and display a corresponding image for each expression according to a given situation.

As described above, a sensitive impression for an experience of a call may be provided to the user by displaying the captured images simultaneously with call termination.

At step 240, the terminal 100 determines whether user selection is received with respect to at least one of the images displayed at step 235.

When the user selection is not received in step 240, the terminal 100 terminates the call. When the user selection is received, at step 245, the terminal 100 performs an operation corresponding to an image selected based on the input received at step 240. The corresponding operation includes at least one of an operation of displaying again the video at the point of time when the selected image is captured, an operation of separately storing the selected image, an operation of sharing the selected image with another user, an operation of determining the selected image as a representative image, or an operation of editing the selected images.

Figure 3:
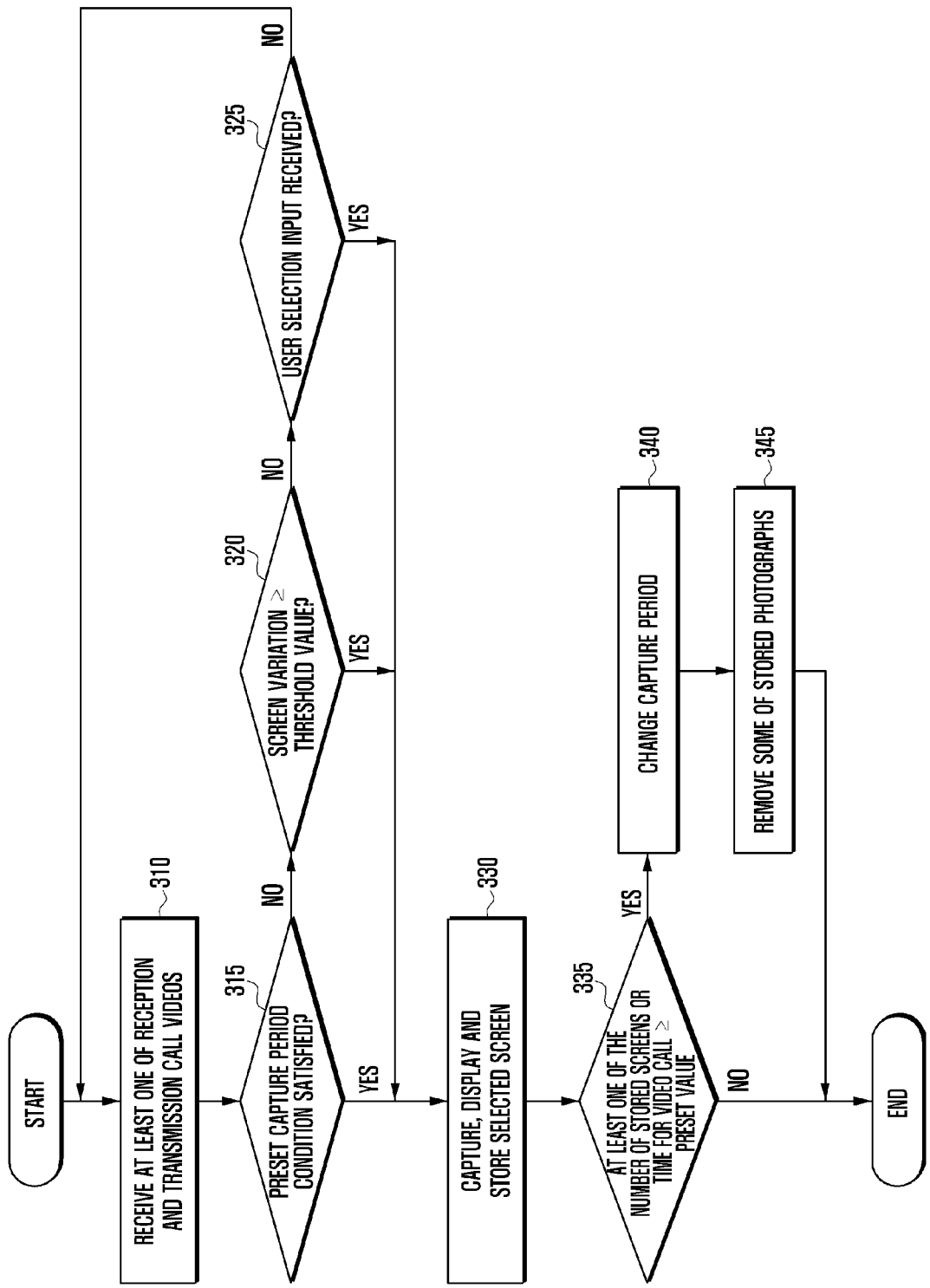
FIG. 3 is a flowchart illustrating a method of processing an image when the terminal performs a video call according to an embodiment of the present invention.

FIG. 3 is a flowchart illustrating a method of processing an image when the terminal performs a video call according to an embodiment of the present invention.

Referring to FIG. 3, at step 310, the terminal 100 receives at least one of a reception call video or a transmission call video.

At steps 315 to 325, the terminal 100 determines whether the at least one of the reception call video or the transmission call video satisfies a capture condition.

In detail, at step 315, the terminal 100 determines whether a period for capturing the video satisfies a preset capture period condition. Further, the preset capture period condition may be a certain time or a variable time, and is determined by the timer 162 of FIG. 1.

At step 320, the terminal 100 determines whether a screen variation of at least one of the reception call video or the transmission call video is greater than or equal to a threshold value. The variation of the video may include an expression variation of the user. The variation of the screen is determined by the video variation sensor 164 of FIG. 1 according to the present invention.

At step 325, the terminal 100 determines whether user selection input is received. The user section input includes an input that the user selects a photograph to be captured, and is received by the input unit 120 of FIG. 1.

At steps 315 to 325, when the capture condition is not satisfied, the terminal 100 returns to step 310 and continuously receives at least one of the reception call video or the transmission call video.

When the capture condition is satisfied in any of steps 315 to 325, the terminal 100 captures a screen corresponding to the satisfied condition at step 330. Further, at step 330, the terminal 100 displays the captured screen on the display unit 100 or stores the captured screen.

When at least one of the number of screens stored at step 330 or a time for the video call is greater than or equal to a preset value at step 335, the terminal 100 changes a capture period at step 340. In detail, when the number of stored screens exceeds a preset value or the time of the video call exceeds a preset time, the terminal 100 changes the capture time into a longer time.

At step 345, the terminal 100 removes some of previously stored photographs. In the removing operation, the photograph stored in the storage unit 130 may be actually removed, or some of the photographs may be processed not to be displayed. Step 345 may be selectively performed according to the embodiment. As described above, when the photograph stored in the storage unit 130 is removed, a capacity load of the storage unit 130 of the terminal 100 can be reduced, and the user can easily view captured photographs of entire calls by processing some of the photographs not to be displayed on the display unit 110.

Figure 4:
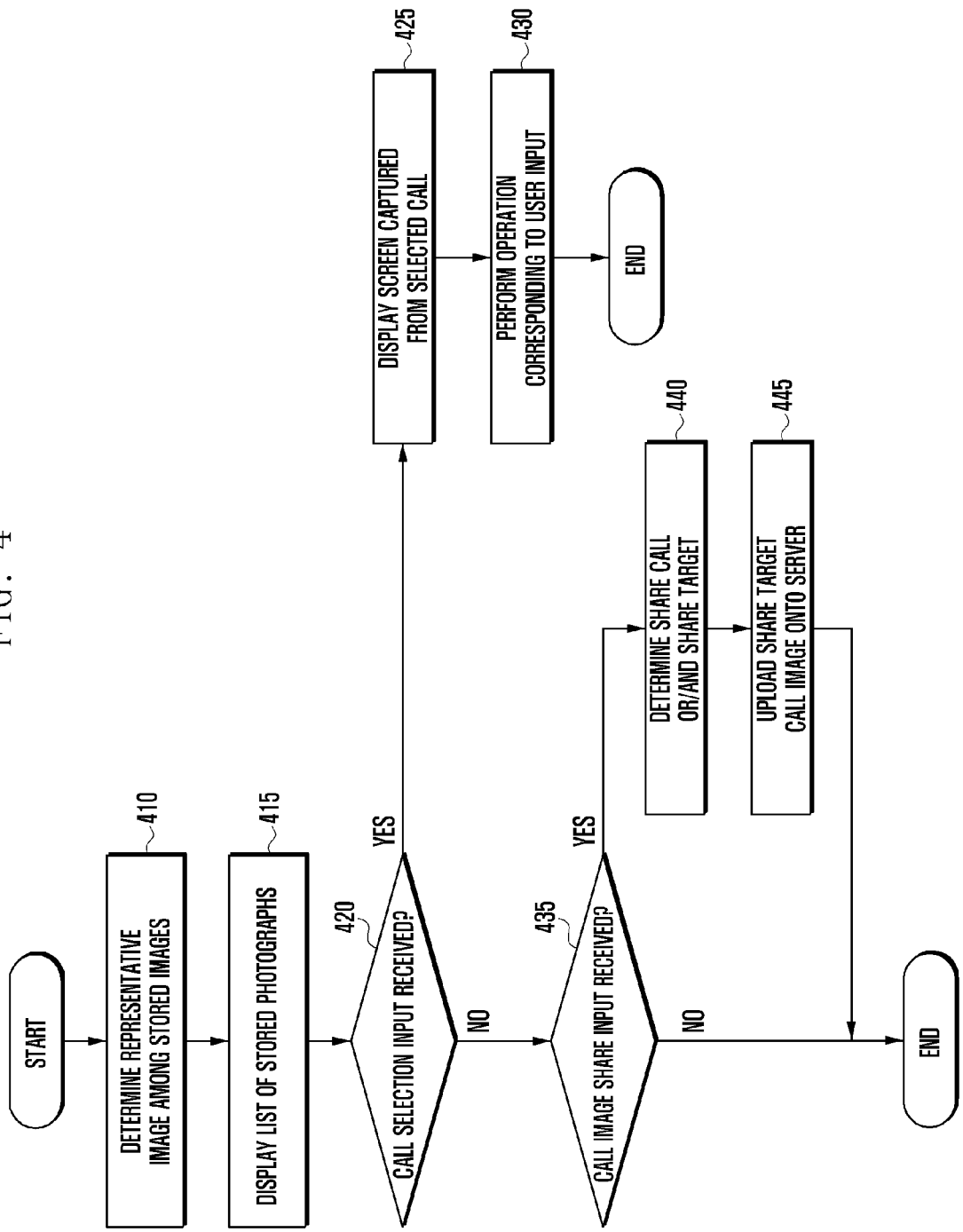
FIG. 4 is a flowchart illustrating a method of managing and sharing an image related to video call by a terminal according to an embodiment of the present invention.

FIG. 4 is a flowchart illustrating a method of managing and sharing an image related to video call by a terminal according to an embodiment of the present invention.

At step 410, the terminal determines a representative image among images stored according to capture during a video call. The terminal 100 may determine the representative image through user input. When there is no user input, the terminal 100 may select one of the stored images as the representative image.

At step 415, the terminal 100 displays a plurality of stored lists of photographs captured during a video call including the determined representative image. The each photograph corresponds to a video call.

At step 420, the terminal 100 determines whether a call selection input is received. The call selection input comprises a selection of a photograph in the lists of photograph.

When the call selection input is received, at step 425, the terminal 100 displays a screen captured from the selected call.

At step 430, the terminal 100 performs a corresponding operation according to user input. The corresponding operation may include at least one of separate storage of selected photographs, storage after moving to another medium, edition of the selected photographs, or designation of the selected photographs as a profile photo.

When the call selection input is not received at step 420, the terminal 100 performs step 435. Step 420 may be selectively performed according to the present invention, and step 435 may be previously performed without performing step 420.

At step 435, the terminal 100 determines whether a call image share input is received.

When the call image share input is received at step 435, at step 440, the terminal 100 determines at least one of a share call or a share target. The determination may be achieved based on user input, and at least one call among a call list captured according to the user input may be selected. Further, the terminal 100 may receive an input of determining a share target user with whom the call image is to be shared.

At step 445, the terminal 100 uploads the determined share target call image onto a server. The terminal 100 may directly transmit a share target call image to the terminal of the share target user. Accordingly, the call list can be simultaneously uploaded or transmitted, such that call contents can be easily shared.

FIGS. 5A and 5B are diagrams illustrating a display unit when the terminal performs the video call according to an embodiment of the present invention.

Referring to FIG. 5A, the terminal 500 includes a region displaying at least one of an image or a video related to a video call on the display unit 501.

The display unit 501 includes a plurality of regions. In detail, the display unit 501 includes another party user display region 502, a terminal user display region 504, and a capture image display region 506. Further, the display unit 501 displays a capture selection icon 505. When the user selects the capture selection icon 505, at least one of the terminal user image or the other party user image may be captured. According to the present invention, the display unit 501 may display a plurality of capture selection icons to capture a video for each user.

The video of the other party user of the call is displayed on the other party user display region 502, and the image of a user side using the terminal 500 is displayed on the terminal user display region 504.

The image of the user captured by satisfying a preset capture condition is displayed on the capture image display region 506. Images 507 and 509 of the other party user and images 508 and 510 of the user of the terminal 500 may be simultaneously displayed.

Referring to FIG. 5B, the terminal 500 displays at least one of an image or a video related to a video call on the display unit 501.

The display unit 501 may separately display the other party user image display region 516 and a terminal user image display region 518. The user image displayed on the image display region may be displayed sequentially according to a captured time. The display unit 501 may include a separate capture selection icon 517 to capture a terminal user image.

Figure 6A:
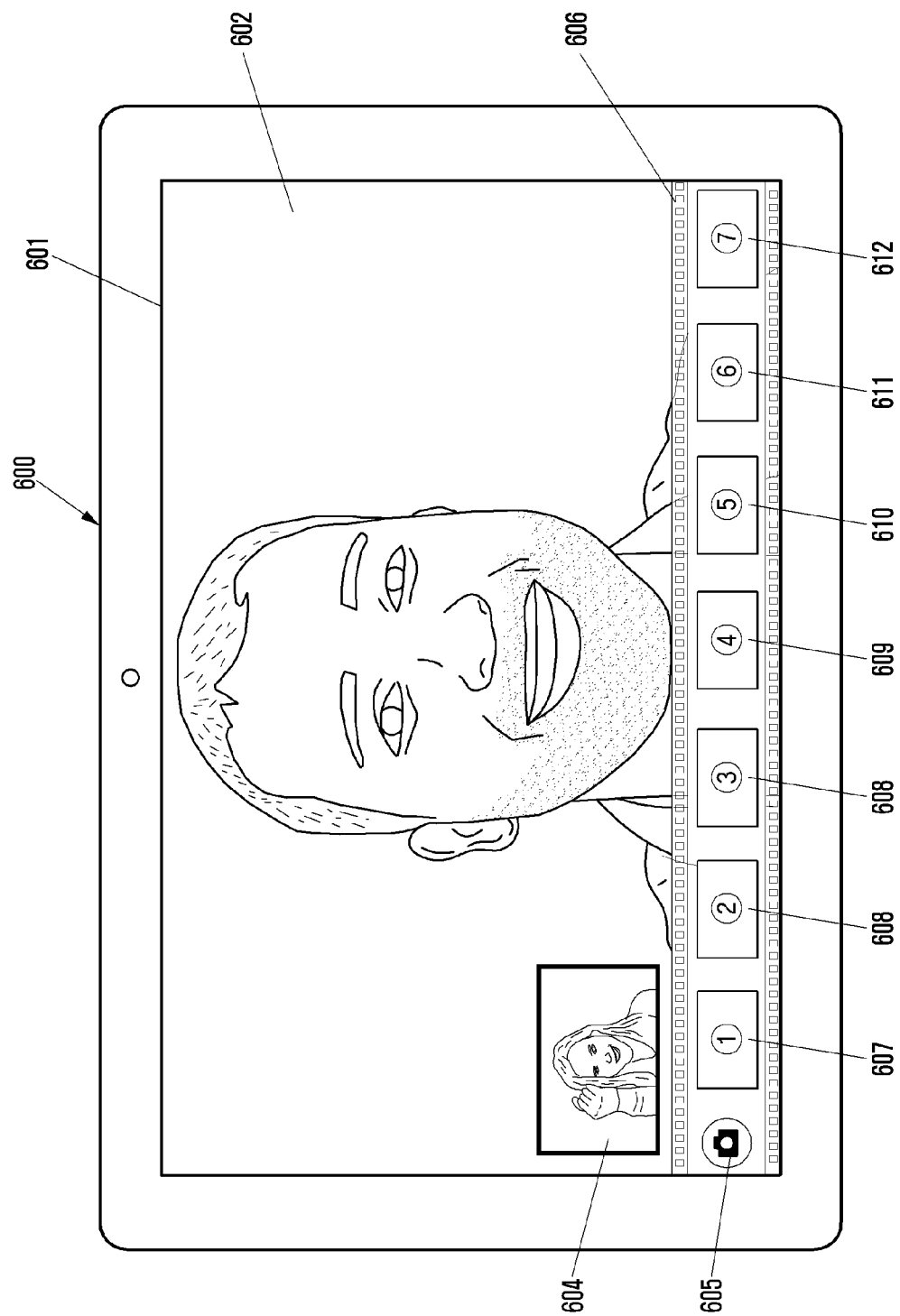

FIGS. 6A and 6B are diagrams illustrating a method of displaying moving images captured during a video call by the terminal according to an embodiment of the present invention.

Referring to FIG. 6A, a terminal 600 includes a region displaying at least one of an image or a video related to a video call on the display unit 601.

The display unit 601 includes a plurality of regions. In detail, the display unit 601 includes another party user display region 602, a terminal user display region 604, and a capture image display region 606. Further, the display unit 601 may display a capture selection icon 605. When the user selects the capture selection icon 605, at least one of the terminal user image or the other party user image may be captured. According to the present invention, the display unit 601 may display a plurality of capture selection icons to capture the image for each user.

The image of the other party user of the call is displayed on the other party user display region 602, and the image of a user side using the terminal 600 is displayed on the terminal user display region 604.

The image of user captured by satisfying a preset capture condition is displayed on the capture image display region 606. Photographs 607 to 612 displayed on the capture image display region 606 are displayed by using numerals to indicate the order of the captured image; however, a photograph of the user during the call or the other party user may be displayed on the capture image display region 606.

The photographs displayed on the capture image display region 606 may be aligned and displayed based on the order of capture. In the present embodiment, a total of seven photographs are captured during the call, and may be sequentially captured and displayed from a left side to a right side.

Referring to FIG. 6B, a total of thirteen photographs are captured during the call, and seven photographs 607, 611, 614, 615, 616, 617, and 618 may be selectively displayed from among the thirteen photographs.

In a case of the selected photographs, the number of photographs displayed on the capture image display region 606 may be maintained within a certain range by removing or not displaying some of previously captured photographs as the number of captured photographs is increased. According to the embodiment, certain captured photographs may be hidden between the neighboring captured photographs and are not displayed or the oldest captured photographs are not displayed. Captured images may be sequentially displayed on the capture image display region in a scroll form by displaying a newly captured photograph while not displaying the oldest captured photograph.

Figure 7A:
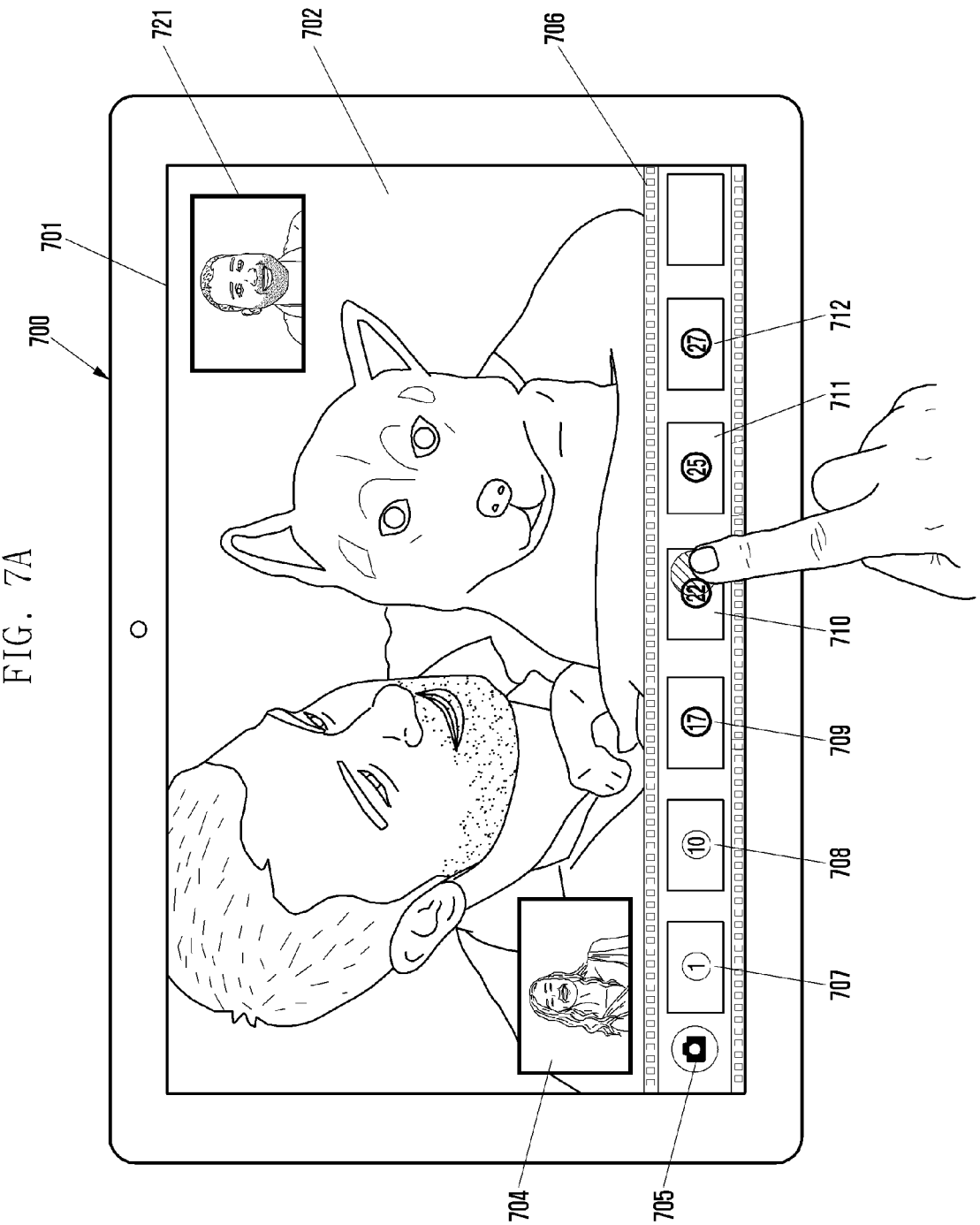
FIGS. 7A and 7B are diagrams illustrating a method of displaying a moving image captured during a video call by the terminal according to another embodiment of the present invention.
Figure 7B:
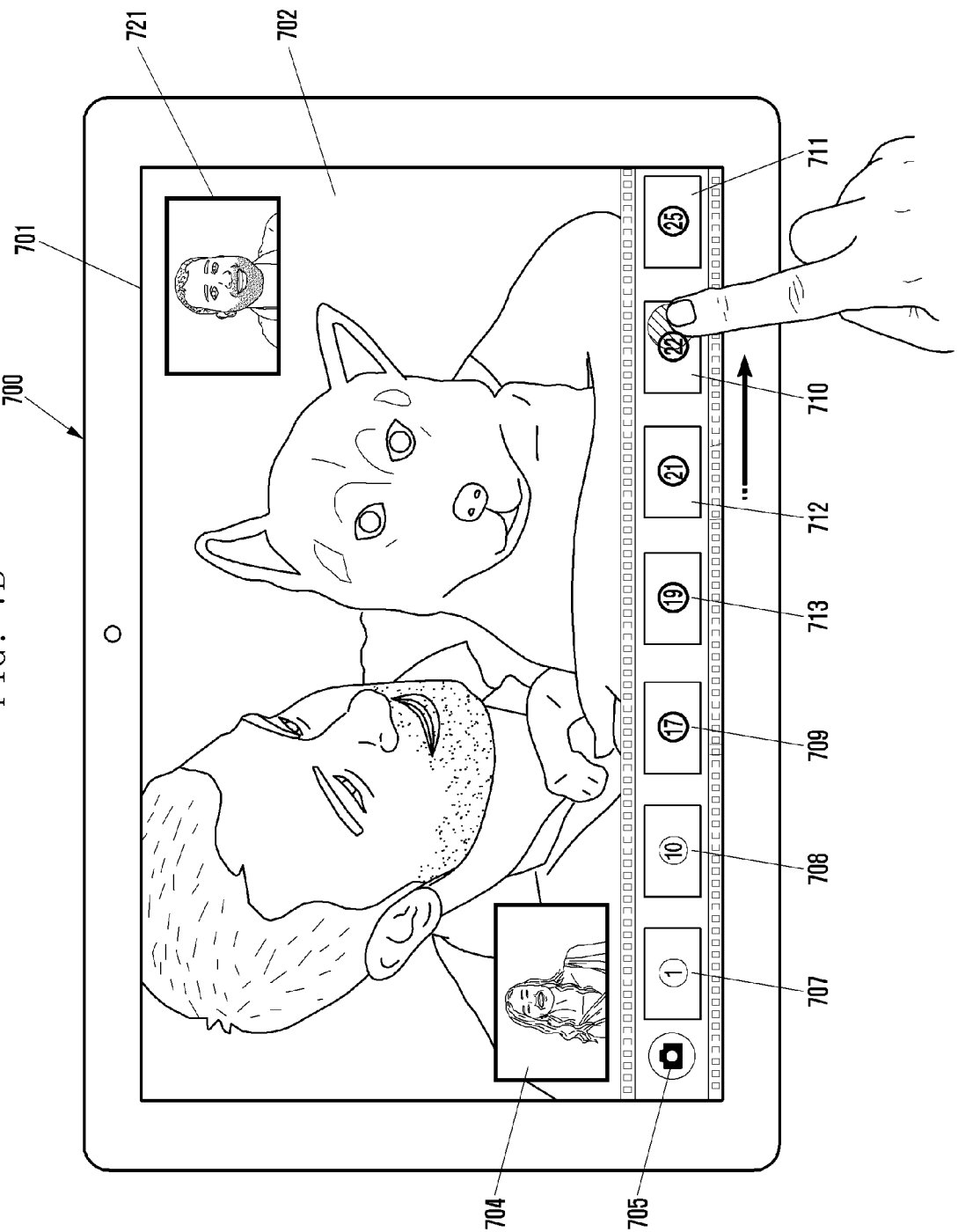

FIGS. 7A and 7B are diagrams illustrating a method of displaying moving images captured during a video call by the terminal according to another embodiment of the present invention.

Referring to FIG. 7A, a terminal 700 includes a region displaying at least one of an image or a video related to a video call on a display unit 701.

The display unit 701 includes a plurality of regions. In detail, the display unit 701 includes another party user display region 702, a terminal user display region 704, and a capture image display region 706. Further, the display unit 701 may display a capture selection icon 705. When the user selects the capture selection icon 705, at least one of the terminal user image or the other party user image may be captured. The display unit 701 may display a plurality of capture selection icons to capture the images for each user.

The image of the other party user of the call is displayed on the other party user display region 702, and the image of a user side using the terminal 700 is displayed on the terminal user display region 704.

The image of the user captured by satisfying a preset capture condition may be displayed on the capture image display region 706. Photographs 707 to 712 displayed on the capture image display region 706 are displayed by using numerals to indicate the order of the captured image; however, a photograph of the user during the call or the other party user may be displayed on the capture image display region 706.

The photographs displayed on the capture image display region 706 may be aligned and displayed based on the order of capture. A total of seven photographs are captured during the call, and may be sequentially captured and displayed from a left side to a right side in order of capture.

According to the present embodiment, if one photo 710 is selected from the captured photographs, the video which is stored at the point of time when the photograph is captured may be displayed on an image playback region 721. The video played from the image playback region 721 may be transmitted to the other party user.

Referring to FIG. 7B, when the user selects a specific photograph 710 in FIG. 7A and drags the selected specific photograph in a specific direction, photographs 712 and 713, which are hidden between neighboring captured photographs not to be displayed, may be displayed. The type of the input is not limited to a drag. The user can detect the displayed capture image in this manner, such that user convenience can be improved.

Figure 8A:
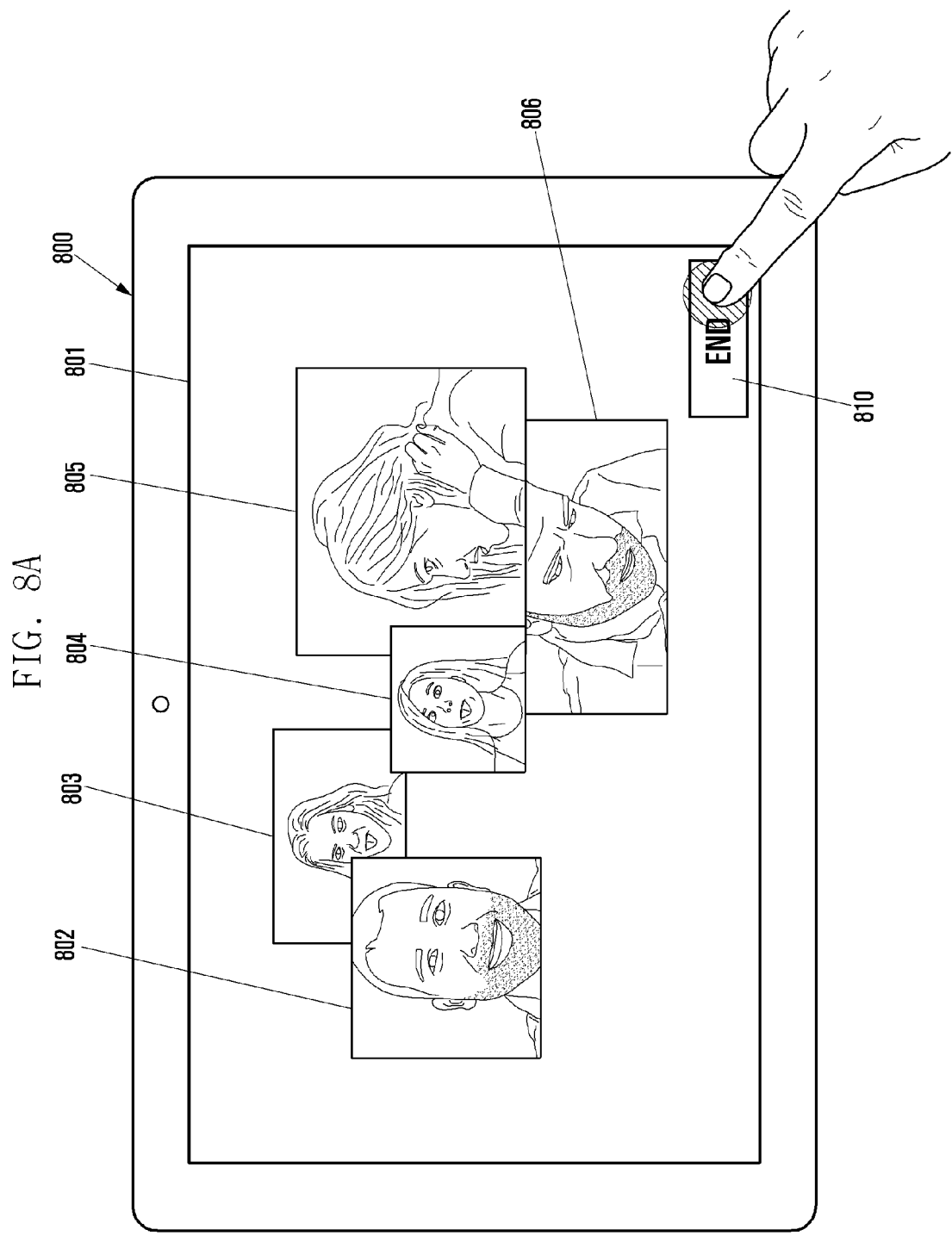
FIGS. 8A and 8B are diagrams illustrating a User Interface (UI) of a display unit when the terminal terminates the video call according to an embodiment of the present invention.
Figure 8B:
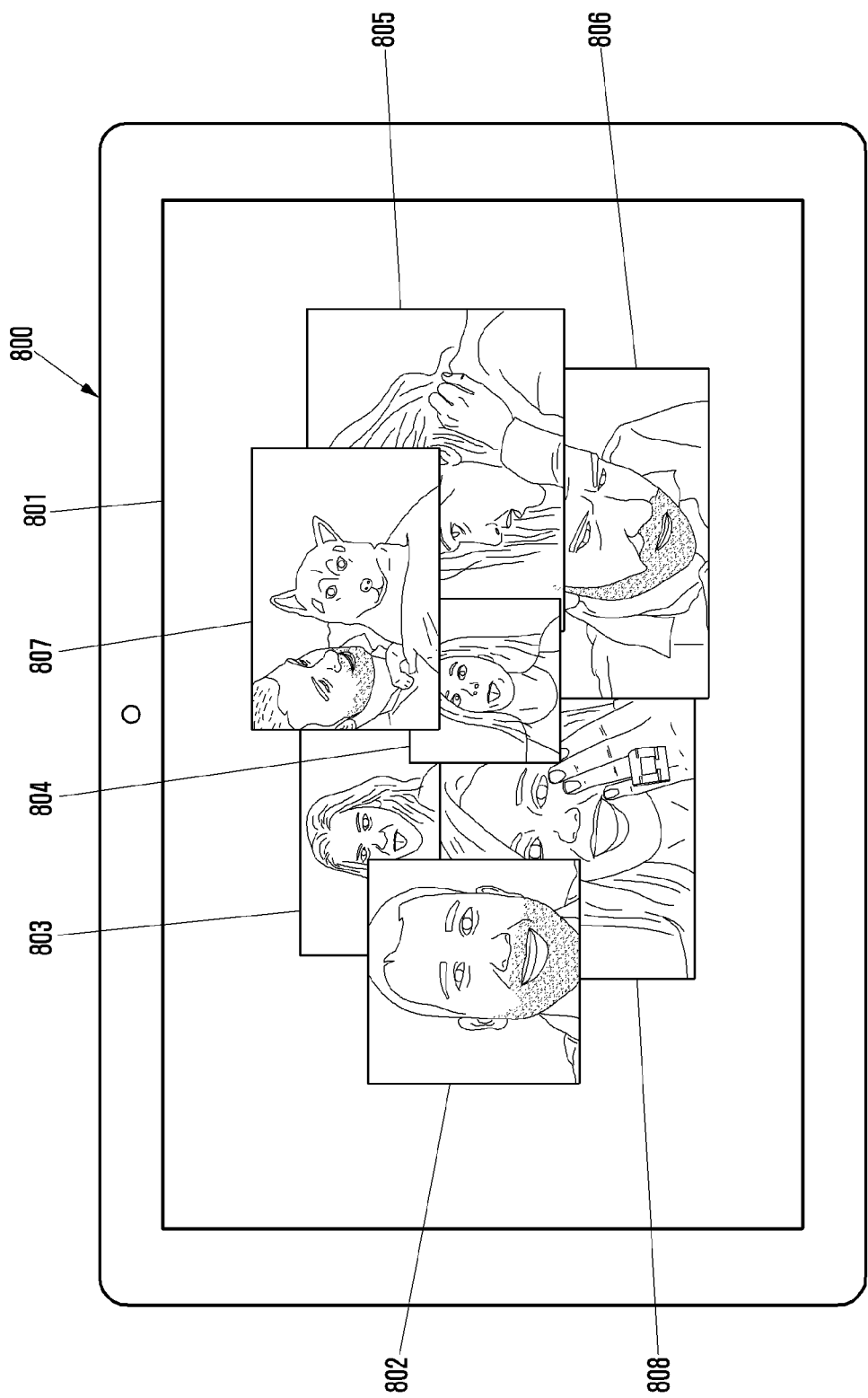

FIGS. 8A and 8B are diagrams illustrating a User Interface (UI) of a display unit when the terminal terminates the video call according to an embodiment of the present invention.

Referring to FIGS. 8A and 8B, when the video call is terminated, a terminal 800 according to the embodiment of the present invention displays at least one of the images captured during the video call on a display unit 801.

A case where the video call is terminated includes at least one of a case where a termination input 810 of a user for the terminal 800 is received, a case where the video call is terminated according to termination input of the other party user, or a case where a video call is terminated according to other communication situations. In the embodiment of FIG. 8A, when receiving the termination input 810, the terminal 800 displays at least one of images 802 to 806 captured during the call on the display unit 801. The photographs may be displayed to be overlapped, such as the added photographs 807 and 808 of FIG. 8B. Further, in another embodiment, when the video call is terminated, at least one of the images captured during the video call may be displayed in a fade-out form.

FIG. 9 is a diagram illustrating a method of managing and sharing a video call list stored in the terminal according to an embodiment of the present invention.

Referring to FIG. 9, a terminal 900 displays at least one video call capture list 910, 912, 914, and 916 on a display unit 901.

The video call capture list 910, 912, 914, and 916 displays a list of photographs captured during a video call which was previously performed by the user of the terminal 900. The photographs displayed on the list may be images selected from photographs captured during the video call. Further, according to the embodiment, when user selection 911 is performed on the video call capture list 910, 912, 914, and 916, the selected image of the photograph captured during the call may be displayed. The method of displaying the image may include at least one of a slide show or a thumbnail view. If the image is displayed in the thumbnail view type, when the thumbnail is selected, an original photograph corresponding to the selected thumbnail is displayed. A video call list which is displayed on the video call capture list 910, 912, 914, and 916 may be displayed in units of the video call or may be displayed by collecting the video call corresponding to a specific user or by collecting all of the video calls performed with every user. The video call capture list 910, 912, 914, and 916 may be displayed as described above and the image captured during the video call may be visibly recognized according to selection, and the image captured during the video call may be used as a separate photo album.

If a specific video call capture list 910 is selected according to user selection 911, a photograph corresponding to the selected specific video call capture list is displayed on the capture photograph display region 920. The photograph may be displayed in a scroll type according to user input. Further, the terminal 900 may set a capture photograph display region 920 on the whole display unit in order to display an image captured during the video call corresponding to the capture list 910 selected according to the user selection 911.

A user list display region 930 may be displayed on a certain region of the display unit 901. Users displayed on the user list region 930 include users of other terminals stored in the storage unit or a separate address book of the terminal 900. Further, photographs may be shared with other terminal users in the video call capture list 910 or a new contact may be attempted. The new contact may be achieved by a method of performing at least one of a video call, a voice call, message transmission, e-mail transmission, or SNS message transmission. In detail, the user of the terminal 900 selects at least one of terminal users displayed on the user list region 930, and shares the image captured during the video call with the selected user, or attempt the new contact.

In addition, a separate indicator 932 to display a user for attempting a new contact may be displayed. The indicator 932 is displayed to indicate a user capable of performing at least one of a video call, an audio call, message transmission, e-mail transmission, and SNS message transmission. A method of displaying the indicator 932 may be changed according to each contact method, or the indicator 932 may be displayed at a location corresponding to the other party user to whom a user of the terminal 900 can contact through a selected contact method, when the user of the terminal 900 selects each contact method.

Further, the terminal 900 may share at least one of stored capture images with at least one of the other party users. The sharing method may directly transmit at least one of stored captured images to a terminal of the other party user or may upload at least one of the stored capture images to a separate server. When the at least one of the stored capture images is uploaded to the separate server, a share target user may be separately designated so that the uploaded photograph may be shared with a specific user according to the selection of the user of the terminal 900. Moreover, according to the user selection, entire photographs captured during at least one video call may be transmitted or at least one photograph may be selected and uploaded from among the photographs captured during the video call.

According to an embodiment of the present invention, various information related to the video call may be provided to the user during the video call.

Further, according to another embodiment of the present invention, the video image of a reception user and the video image of a transmission user may be captured and displayed so that the video call is recorded based on the captured images, thereby improving user convenience.

In addition, according to another embodiment, a video call image during the call is captured and stored after termination of the call to be displayed so that an improved UI can be provided to the user.

Although embodiments of the present invention have been described in detail hereinabove, it should be clearly understood that many variations and modifications of the basic inventive concepts herein will still fall within the spirit and scope of the present invention, as defined in the appended claims.

What is claimed is:

1. A method for a video call in a terminal for performing the video call, the method comprising:
   receiving at least one of a video of another party user side or a video of a terminal user side;
   determining whether a preset capture condition is satisfied based on the received video;
   capturing at least one image satisfying the preset capture condition;
   determining whether the video call is terminated; and
   displaying at least one of the captured images on a display unit when the video call is terminated.

2. The method of claim 1, further comprising displaying the at least one of the captured images on the display unit of the terminal during the video call.

3. The method of claim 2, wherein displaying the at least one of the captured images on the display unit comprises:
   displaying at least one of the captured images of the video of the other party user side on a first region of the display unit; and displaying at least one of the captured images of the video of the terminal user side on a second region of the display unit.

4. The method of claim 3, further comprising:
selecting one of the captured images; and
playing a video of a point of time when the selected image is captured on a third region of the display unit.

5. The method of claim 1, wherein determining whether the preset capture condition is satisfied comprises at least one of:
determining whether a preset time period elapses;
determining whether a selection input of the terminal user is received; and
determining whether variation of at least one of the received videos exceeds a preset value.

6. The method of claim 5, further comprising changing the preset time period when the number of the captured images exceeds a preset value or when a time for performing the video call exceeds a preset time.

7. The method of claim 5, further comprising removing some of the captured images when the number of the captured images exceeds a preset value or when a time for performing the video call exceeds a preset time.

8. The method of claim 1, further comprising:
determining a target user for sharing the captured images; and
sharing at least one of the captured images with the determined target user.

9. The method of claim 1, wherein determining whether the preset capture condition is satisfied comprises determining whether an expression of the other party user and an expression of the terminal user correspond to a preset expression during the video call; and
wherein capturing the images satisfying the preset capture condition comprises capturing an image of the video when the expression of the other party user and the expression of the terminal user correspond to the preset expression.

10. The method of claim 9, wherein displaying the at least one of the captured images on the display unit comprises selecting and displaying an image corresponding to the preset expression among the captured images on the display unit.

11. The method of claim 9, wherein the preset expression comprises at least one of a smile expression, a surprised expression, or a frown expression; and
wherein displaying the at least one of the captured images on the display unit comprises displaying at least one of images corresponding to the preset expression among the captured images.

12. A terminal for performing a video call, the terminal comprising:
a transceiver configured to receive at least one of a video of another party user side or a video of a terminal user side;
a controller configured to determine whether a preset capture condition is satisfied based on the received video, to capture an image of the video satisfying the preset capture condition, and to determine whether the video call is terminated; and
a display unit configured to display at least one of the captured images when the video call is terminated.

13. The terminal of claim 12, wherein the display unit displays the captured image during the video call.

14. The terminal of claim 13, wherein the display unit comprises:
a first region displaying a captured image of the video of the other party user side; and
a second region displaying a captured image of the video of the terminal user side.

15. The terminal of claim 14, wherein the controller selects one of the captured images, and
the display unit plays a video of a point of time when the selected image is captured on a third region of the display unit.

16. The terminal of claim 12, wherein the preset capture condition comprises at least one of:
a case where a preset time period elapses;
a case where a selection input of the terminal user is received; and
a case where variation of at least one of the received videos exceeds a preset value.

17. The terminal of claim 16, wherein the controller changes the preset time period when the number of the captured images exceeds a preset value or when a time for performing the video call exceeds a preset time.

18. The terminal of claim 16, wherein the display unit does not display some of the displayed images when the number of the captured images exceeds a preset value or when a time for performing the video call exceeds a preset time.

19. The terminal of claim 12, wherein the controller determines a target user for sharing the captured images, and shares at least one of the captured images with the determined target user.

20. The terminal of claim 12, wherein the controller determines whether an expression of the other party user and an expression of the terminal user correspond to a preset expression during the video call, and captures an image of the video when the expression of the other party user and the expression of the terminal user correspond to the preset expression.

21. The terminal of claim 20, wherein the controller selects an image corresponding to the preset expression among the captured images and controls the display unit to display the selected image.

22. The terminal of claim 20, wherein the preset expression comprises at least one of a smile expression, a surprised expression, or a frown expression, and
the controller controls the display unit to display at least one of images corresponding to the preset expression among the captured images.

* * * * *